US012748986B2

(12) United States Patent
Hytoenen et al.

(10) Patent No.: US 12,748,986 B2
(45) Date of Patent: Sep. 29, 2026

(54) SYSTEMS AND METHODS FOR OPTIMIZED TRANSACTION PROCESSING

(71) Applicant: JPMORGAN CHASE BANK, N.A., New York, NY (US)

(72) Inventors: Kari Hytoenen, Irving, TX (US); Ayman Hammad, Pleasanton, CA (US); Gudmundur Gudmundsson, Lutz, FL (US); Taylor Haverkamp, Mountain Lakes, NJ (US); Elizabeth Daniel, Dallas, TX (US); Thomas C. Barton, Newark, DE (US); David Combs, Palm Harbor, FL (US)

(73) Assignee: JPMORGAN CHASE BANK, N.A., New York, NY (US)

( * ) Notice: Subject to any disclaimer, the term of this patent is extended or adjusted under 35 U.S.C. 154(b) by 782 days.

(21) Appl. No.: 18/181,192

(22) Filed: Mar. 9, 2023

(65) Prior Publication Data

US 2024/0303512 A1 Sep. 12, 2024

(51) Int. Cl.
*G06N 5/025* (2023.01)
*G06F 9/46* (2006.01)
*G06F 9/54* (2006.01)

(52) U.S. Cl.
CPC ............ *G06N 5/025* (2013.01); *G06F 9/466* (2013.01); *G06F 9/546* (2013.01)

(58) Field of Classification Search
CPC .......... G06N 5/025; G06N 5/01; G06N 20/00; G06N 20/20; G06F 9/466; G06F 9/546;
(Continued)

(56) References Cited

U.S. PATENT DOCUMENTS 11,507,953 B1 11/2022 Cohn et al.
12,488,310 B2 * 12/2025 Makhija ............... G06Q 10/087
(Continued)

OTHER PUBLICATIONS

Odofin, Integrating Event-Driven Architecture in Fintech Operations Using Apache Kafka and RabbitMQ Systems, pp. 635-643 (Year: 2022).*
(Continued)

*Primary Examiner* — Albert M Phillips, III
(74) *Attorney, Agent, or Firm* — GREENBERG TRAURIG LLP

(57) ABSTRACT

In some aspects, the techniques described herein relate to a method including: providing a plurality of inputs to a payload engine; providing a machine learning engine, wherein the machine learning includes a machine learning model, and wherein the machine learning model is configured to generate output based on the plurality of inputs; providing a rules engine, wherein the rules engine includes a logic tree based on the plurality of inputs; receiving, at the payload engine, a transaction and associated transaction details; generating, by the machine learning engine and based on the transaction, the associated transaction details, and the plurality of inputs, a first transaction processing parameter; generating, by the rules engine, and based on the transaction, the associated transaction details, and the plurality of inputs, a second transaction processing parameter; and combining the transaction, the first transaction processing parameter and the second transaction processing parameter into a transaction payload formula.

11 Claims, 4 Drawing Sheets

(58) Field of Classification Search
CPC ... G06Q 20/4016; G06Q 20/405; G06Q 20/10
See application file for complete search history.

(56) References Cited

U.S. PATENT DOCUMENTS

| | | | | |
|---|---|---|---|---|
| 2010/0312697 | A1 | 12/2010 | Fracchia et al. | |
| 2023/0088436 | A1 * | 3/2023 | Kramme ............ | G06Q 30/0225 705/44 |

OTHER PUBLICATIONS

International Search Report and Written Opinion of the International Searching Authority, dated May 21, 2024, from corresponding International Application No. PCT/US2024/018534.

* cited by examiner

SYSTEMS AND METHODS FOR OPTIMIZED TRANSACTION PROCESSING

BACKGROUND

1. Field of The Invention

Aspects generally relate to systems and methods for optimized transaction processing.

2. Description of the Related Art

A transaction is processed by a transaction processing engine according to a set of parameters received with the transaction to be processed. The included parameters can alter processing aspects that can result in varying outcomes with respect to the transaction. For instance, costs accrued, token utilization, and liability shift protections are exemplary variables with respect to a given transaction and its processing. Clients of a transaction acquiring institution (an acquirer) wish to optimized transaction processing in such a way that provides cost benefits, revenue benefits, particular liability shift protections, and/or other benefits to the client. Conventional platforms, however, are driven by static-detail payloads and inefficient, archaic, and manually managed edit checks of payload details at the transaction processing engine.

SUMMARY

In some aspects, the techniques described herein relate to a method including: providing a plurality of inputs to a payload engine; providing a machine learning engine, wherein the machine learning includes a machine learning model, and wherein the machine learning model is configured to generate output based on the plurality of inputs; providing a rules engine, wherein the rules engine includes a logic tree based on the plurality of inputs; receiving, at the payload engine, a transaction and associated transaction details; generating, by the machine learning engine and based on the transaction, the associated transaction details, and the plurality of inputs, a first transaction processing parameter; generating, by the rules engine, and based on the transaction, the associated transaction details, and the plurality of inputs, a second transaction processing parameter; and combining the transaction, the first transaction processing parameter and the second transaction processing parameter into a transaction payload formula.

In some aspects, the techniques described herein relate to a method, including: sending the transaction payload formula to a transaction processing engine.

In some aspects, the techniques described herein relate to a method, wherein the transaction payload formula is sent as parameters of an API method published by the transaction processing engine and called by the payload engine.

In some aspects, the techniques described herein relate to a method, wherein the transaction payload formula is sent as a message to a messaging queue, and wherein the transaction processing engine consumes the message.

In some aspects, the techniques described herein relate to a method, wherein the plurality of inputs includes client instructions.

In some aspects, the techniques described herein relate to a method, wherein the plurality of inputs includes regional rules.

In some aspects, the techniques described herein relate to a method, wherein the plurality of inputs includes network rules.

In some aspects, the techniques described herein relate to a system including at least one computer including a processor, wherein the at least one computer is configured to: receive a plurality of inputs at a payload engine; execute a machine learning engine, wherein the machine learning includes a machine learning model, and wherein the machine learning model is configured to generate output based on the plurality of inputs; execute a rules engine, wherein the rules engine includes a logic tree based on the plurality of inputs; receive, at the payload engine, a transaction and associated transaction details; generate, by the machine learning engine and based on the transaction, the associated transaction details, and the plurality of inputs, a first transaction processing parameter; generate, by the rules engine, and based on the transaction, the associated transaction details, and the plurality of inputs, a second transaction processing parameter; and combine the transaction, the first transaction processing parameter and the second transaction processing parameter into a transaction payload formula.

In some aspects, the techniques described herein relate to a system, wherein the at least one computer is configured to: send the transaction payload formula to a transaction processing engine.

In some aspects, the techniques described herein relate to a system, wherein the transaction payload formula is sent as parameters of an API method published by the transaction processing engine and called by the payload engine.

In some aspects, the techniques described herein relate to a system, wherein the transaction payload formula is sent as a message to a messaging queue, and wherein the transaction processing engine consumes the message.

In some aspects, the techniques described herein relate to a system, wherein the plurality of inputs includes client instructions.

In some aspects, the techniques described herein relate to a system, wherein the plurality of inputs includes regional rules.

In some aspects, the techniques described herein relate to a system, wherein the plurality of inputs includes network rules.

In some aspects, the techniques described herein relate to a non-transitory computer readable storage medium, including instructions stored thereon, which instructions, when read and executed by one or more computer processors, cause the one or more computer processors to perform steps including: providing a plurality of inputs to a payload engine; providing a machine learning engine, wherein the machine learning includes a machine learning model, and wherein the machine learning model is configured to generate output based on the plurality of inputs; providing a rules engine, wherein the rules engine includes a logic tree based on the plurality of inputs; receiving, at the payload engine, a transaction and associated transaction details; generating, by the machine learning engine and based on the transaction, the associated transaction details, and the plurality of inputs, a first transaction processing parameter; generating, by the rules engine, and based on the transaction, the associated transaction details, and the plurality of inputs, a second transaction processing parameter; and combining the transaction, the first transaction processing parameter and the second transaction processing parameter into a transaction payload formula.

In some aspects, the techniques described herein relate to a non-transitory computer readable storage medium, including: sending the transaction payload formula to a transaction processing engine.

In some aspects, the techniques described herein relate to a non-transitory computer readable storage medium, wherein the transaction payload formula is sent as parameters of an API method published by the transaction processing engine and called by the payload engine.

In some aspects, the techniques described herein relate to a non-transitory computer readable storage medium, wherein the transaction payload formula is sent as a message to a messaging queue, and wherein the transaction processing engine consumes the message.

In some aspects, the techniques described herein relate to a non-transitory computer readable storage medium, wherein the plurality of inputs includes client instructions.

In some aspects, the techniques described herein relate to a non-transitory computer readable storage medium, wherein the plurality of inputs includes regional rules and network rules.

DETAILED DESCRIPTION

Figure 1A:
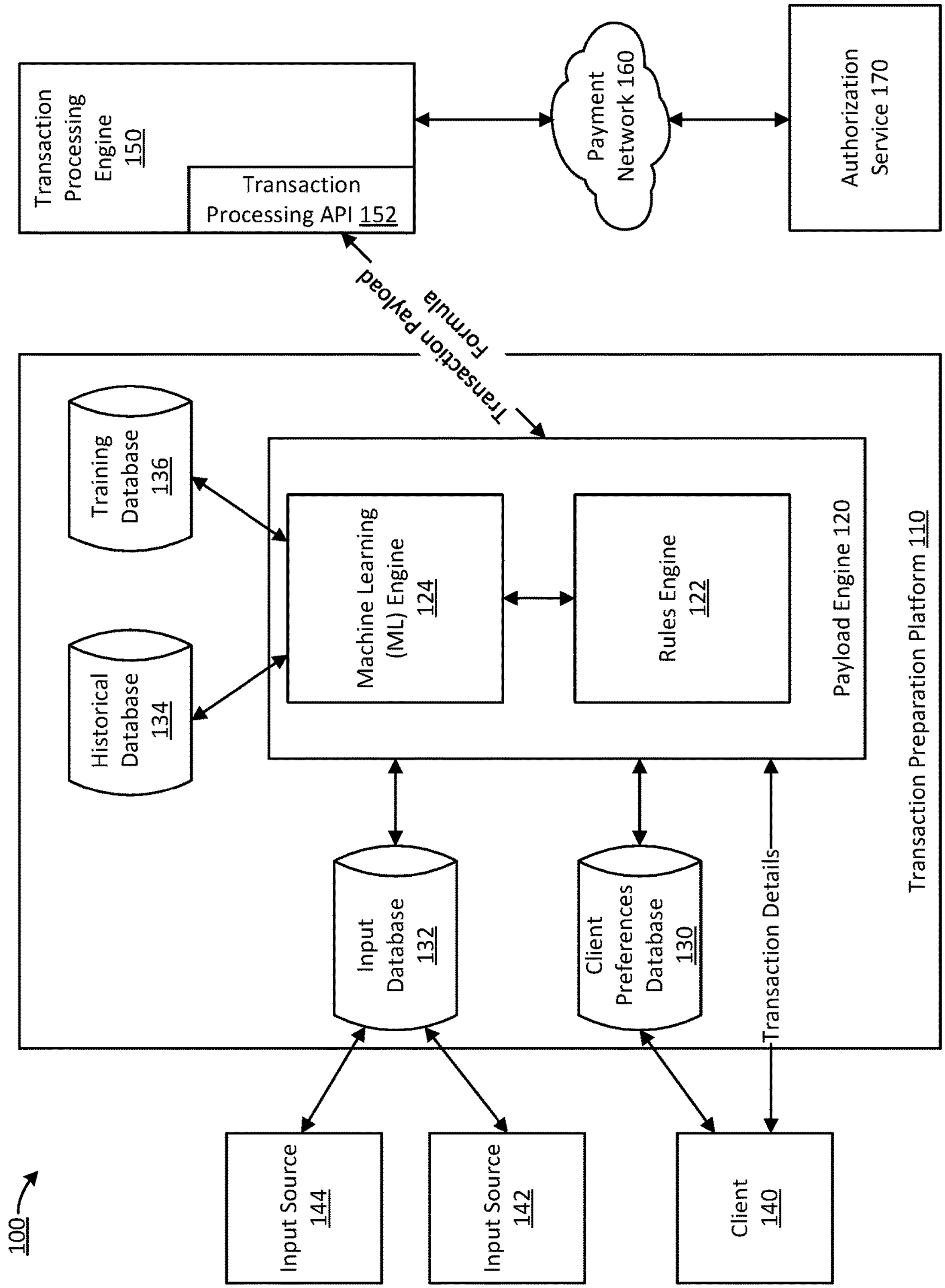
FIG. 1A is a block diagram of a system for providing transaction payload formulas, in accordance with aspects.

Aspects generally relate to systems and methods for optimized transaction processing. In accordance with aspects, systems and methods may utilize artificial intelligence (AI) and machine learning (ML), including deep learning, which drive a self-updating approach to maintaining optimized compliance with various applicable rules in a transaction processing environment. The subject implementation may self-adjust when new rules, regulations, client requests, etc., are provided to the environment.

While aspects described herein use a payment transaction as an exemplary transaction, it is contemplated that the techniques described herein may be applied to any processing environment that prepares a parameter payload where the parameters indicate steps in a processing routine.

In accordance with aspects, relevant parties to an exemplary transaction may include: a consumer that seeks to buy a good or service from a merchant; the merchant offering the good or service for sale; an acquirer (i.e., an institution that services transactions submitted by a merchant and submits transactions to a payment network for further processing); a payment product issuer (an issuer) that issues a payment product used by the consumer to pay for the good or service and that provides a transaction service that authorizes or declines the transaction; and a payment network provider that provides a payment network that transmits details of a transaction between the acquirer and the issuer. In some cases, the acquirer and the issuer may be the same institution.

Exemplary transaction processing may begin between a merchant and a consumer. A merchant may accept a payment product from a consumer at, e.g., a point-of-sale device (POS). The POS may be in operative communication with an acquirer that the merchant is a client of. In addition to POS (i.e., card-present) transactions, transaction processing may include acceptance of payment products via eCommerce websites, other card-not-present type transactions, and/or any other omni-channel transactions. The acquirer receives the transaction and transaction details and passes the transaction and associated details onto a payment network. The payment network passes the transaction and associated details onto the issuer that issued the consumer's payment product. The issuer is responsible for authorizing or declining the transaction. Once the issuer has determined a response to the transaction (i.e., either an authorization of a declination of the received transaction), the response is sent back to the merchant via the payment network and the acquirer.

In the exemplary transaction described above, the merchant is a client of the acquirer, and the consumer is a client of the issuer. The acquirer and the issuer are clients of the payment network provider. The acquirer offers merchant services, including payment services. As part of the payment services provided by the acquirer, the acquirer receives a transaction from the merchant and prepares the transaction for transport over the payment network and for authorization processing by the issuer.

An acquirer may provide a transaction processing engine that performs edit checks on transactions received from merchant clients and forwards a transaction along with required and, in some cases, optional data parameters to a payment network, which, in turn, will communicate some or all of the data parameters to an authorization service of an issuer. A transaction payload refers to a collection of transaction details including any required or optional data parameters needed by either a payment network or a transaction authorization service (e.g., provided by a payment product issuer) in order to process a transaction and return an authorization decision to the acquirer and, ultimately, a merchant. An "edit check" may be a series of validation checks against corresponding rules that is performed at a transaction processing engine. An edit checking routine may involve checking the data parameters included in a transaction payload against known rules and/or requirements to ensure, at a minimum, that the transaction payload includes all data parameters required by the payment network and authorization service to perform delivery to, and processing of, the transaction at the authorization service.

A conventional transaction processing engine utilizes manually built and maintained edit checks at the processing engine to regulate transactions according to known processing rules. The creation and maintenance of edit check routines involves writing computer program (i.e., computer application) code and creating and implementing manual updates to the code based on operational, regulatory, and other implications with respect to transaction processing. A human actor (e.g., a developer) may focus on a single particular area of relevance (e.g., regulatory requirements, payment network requirements, authorization service requirements, etc.) and individual checks may be considered, built, and implemented in an ad hoc fashion. However, an ad hoc approach to addressing the various considerations in a transaction processing environment is prone to oversight with respect to interactions between participatory entities and components and results in a transaction processing system that is not optimized across various components because it is built by different persons that have not taken the totality of the applicable rules and options into consideration. Additionally, governmental regulations combined with other rules based on considerations from various relevant parties to the transaction processing scheme may result in conflicts that prevent authorization of received transactions at an authorization service.

In accordance with aspects, a transaction preparation platform may consider rules and various processing options applicable at various stages of a transaction processing scheme and may provide a transaction payload formula for submission to a downstream transaction processing engine. A transaction payload formula is a transaction payload that is dynamically built by a payload engine and includes various data parameters in a transaction payload, where the parameters are based on various inputs into the payload engine. Inputs may include rules and various processing options that originate from the various parties involved in processing a transaction, and from jurisdictional and/or regional entities (e.g., governments, standards bodies, etc.) that provide mandated rules and regulations, and/or best practices, with respect to transaction processing.

Exemplary inputs to a payload engine may include clients (e.g., merchants) submitting processing preferences with respect to optimization favoring, e.g., revenue enhancement, cost reduction, or other considerations. Other examples include payment network providers issuing payment network rules that govern and qualify transactions submitted for transport on the payment networks. Additionally, different regions and jurisdictions (e.g., the European Union (EU), the United States (US), etc.) have their own legal frameworks, and all regulatory implications, including mandates, rules, guidelines, etc., may be considered by a transaction preparation platform when preparing transaction payload formulas. Issuers, too, may have organizational rules to, e.g., reduce authorization of fraudulent transactions or process transactions according to value added services offered by the issuer. The various types of inputs to a transaction preparation platform, and a payload engine are discussed in more detail, herein.

A payload engine may analyze various inputs in view of a received transaction using trained ML models and a rules engine in order to dynamically produce a transaction payload formula based on a received transaction and all relevant input to the payload engine.

Advantages of aspects described herein over conventional transaction processing engines include a reduction or elimination of manual coding of edit checks (e.g., validation rules) at the transaction processing system. Supplanting manually developed edit checks at the transaction processing level with transaction formulas that are generated ahead of the transaction processing engine through a combination of ML model and rule engine decisioning eliminates the need for, or greatly reduces reliance on, edit checks at the transaction processing engine and automates rigorous and accurate adherence to the input rules described herein. Aspects additionally provide a processing transaction engine with the most optimized set of rules reflecting a client's desired outcome and the transaction at hand, all while considering jurisdictional mandates and issuer considerations. An exemplary platform can build a valid and dynamic payload formula for delivery to a transaction processing engine based on input rules to, and output from the applied ML model and rules engine, thereby replacing or deemphasizing stale and static edit check code.

In accordance with aspects, a transaction preparation platform may include a payload engine that provides a transaction payload formula including values for required fields and other data elements based on transaction processing rules from various sources, an input transaction, and historical transaction processing data. The payload engine may derive the transaction payload formula (the output) from a combination of ML model output and output from a rules engine. The output may include a primary transaction payload formula and one or more secondary payload formulas as backup formulas.

Input to a payload engine may include data from various information sources. Exemplary input may include: client instructions; available value-added services from the platform provider; payment network rules provided by a payment network provider; regional and/or governmental rules for a relevant jurisdiction (e.g., the region/government that has jurisdiction over a given transaction); the transaction being processed; and prior processing results (i.e., historical transaction data maintained by the platform). These input categories are meant to be exemplary, and input may overlap two or more categories. For instance, network rules may be regional in that they vary across different regions and are driven by different legal/regulatory obligations.

In accordance with aspects, a client instruction may be a directive or preference received from a client that indicates a desired result with respect to a given transaction or a related group of transactions. For instance, a client may indicate that it wants a transaction preparation platform to optimize revenue. Alternatively, a client may indicate that it wants the platform to minimize cost with respect to a transaction. In other cases, a client may want the most balanced approach to revenue enhancement and cost reductions. Such instructions may be based on a client's service, which may be a good or a service, including digital and/or physical goods and services.

An optimization of revenue streams means that a transaction preparation platform is weighting transaction authorization above declinations due to an assigned or derived risk profile of a transaction. For instance, a digital goods or service provider (e.g., a software company or digital music provider) does not incur high costs in reproducing the goods they are selling, and "losing" a good/service due to a fraudulent transaction does not constitute a high cost due to the intangible nature of the provided digital good and the ease of reproducing the digital good. Accordingly, because costs will be inherently low for a digital goods merchant, the merchant may provide an instruction to maximize revenue streams with respect to transaction processing.

On the other hand, a physical goods or service company, such as, e.g., a packaged consumer goods company, incurs a high cost for lost goods. Indeed, a physical goods company may be thought of as losing twice due to a fraudulent transaction, because the revenue of the transaction is lost, but the goods themselves are also usually lost. Accordingly, a company dealing in physical goods may be risk averse and provide client instructions that weigh preventing fraudulent transactions (i.e., reducing costs) over a more frictionless approval of the transaction.

Exemplary client instructions may include an indication for weighting that favors one of cost reduction, revenue increase, reduced consumer friction, etc. Additionally, client instructions may reflect regional guidelines (e.g., best practices that do not carry the force of law), a preference of, or requirement of, various transaction services (e.g., value added services) offered by the platform provider, and routing instructions that may implicate transaction cost and/or commitment, etc.

In accordance with aspects, client instructions may be evaluated by an ML engine of the platform for potential impacts with the goal of preventing a client from creating a suboptimal processing formula. In the event the platform predicts a conflict or a suboptimal processing formula, the platform may inform the client with a message and require the client to confirm the instructions that may cause the platform to produce a suboptimal transaction processing formula. Client instructions and other client interactions and interchanges (such as messages from the platform to the client) may be facilitated via a client-facing management portal provided by the platform.

Value added services include services offered by the transaction processing platform that may enrich the transaction. Value added services may be requested by a client or may be automatically added to a transaction's processing steps by the payload engine based on other input with respect to the transaction. Value added protections include liability protections for the client such as fraud detection services (and various levels thereof), tokenization of card/account numbers, data protections services, etc. Other value-added services may include particular routing instructions and interchange management options (interchange management involves interchange fees which are the fees that payment networks assess to transactions). Still other services include authentication services such as Fast Identity Online (FIDO) authentication, 3DS authentication, biometric authentication, etc. Issuers may further offer multi acquirer/gateway processing. Value added services may be indicated in an output payload based on an express request from a client, an implied client instruction, a jurisdictional mandate, etc.

In a client facing management portal, available value-added services may be provided for selection along with instructions indicating how the service may be effectively used, guidelines on whether the service is required or may be omitted, and documentation on the potential impact that a service may add to transaction processing.

Network rules may be operational rules provided by the various payment networks, such as Mastercard®, Visa®, Discover®, American Express®, etc. These rules vary depending on the payment network that is being used and may be considered by a transaction preparation platform. Examples include rules regarding cardholder-initiated transactions versus merchant initiated transactions. Other network rules include payment card industry (PCI) rules and rules with respect to banks accounts (e.g., National Automated Clearinghouse Association (NACHA) rules), single euro payments area (SEPA) rules, and payment service providers directive (PSD2) rules), etc. Failure to follow network rules in transaction processing (e.g., failure to provide required data parameters in a transaction payload) may result in the transaction being declined.

Network rules may also include assignment of an appropriate interchange classification. An interchange classification is the fee that the merchant pays to the payment network when a card transaction is processed. These are generally on a per-transaction basis and based on the type of transaction. Examples of interchange classification assignment include one interchange classification for a card-present transaction and a different interchange classification for a card-not-present transaction. A fee may be a given percentage of the transaction and may include a set fee as well (e.g., 1.4% plus a set amount for a first interchange classification, or 1.9% plus an amount for a second interchange classification). Accordingly, when a transaction process platform provider is acting as an acquirer (i.e., the institution that the merchant is a client of) the acquirer and the merchant must be coordinated with respect to network rules in order to assure that the correct interchange fees are assessed by the payment network. Assignment of an incorrect interchange classification may increase the merchant's costs by assessing an incorrect fee or may affect revenue by causing the payment network to reject the transaction.

In accordance with aspects, regional rules may be another input to a payload engine. Regional rules include jurisdictional legal obligations that may be considered depending on the jurisdiction where the transaction will take place and/or the jurisdiction that governs the transaction. Different legal jurisdictions have different requirements for transaction processing. For instance, in Europe, the PSD2 is a well-documented jurisdictional rule source. It lays out particular exception paths, risk avoidance paths, etc., for transaction processing. It is advantageous to incorporate such documented rules into a transaction processing system because other providers will also be implementing such rules. Other regional rules and/or legal frameworks include the general data protection regulation (GDRP), the California consumer privacy act (CCPA), Sarbanes-Oxley (SOX), the so-called Durbin amendment, and other similar governmental and regulatory rules throughout the various jurisdictions of the world.

The transaction being processed, and data associated therewith may also be input to the payload engine. In addition to providing the actual transaction details in the payload formula, other processing details may be derived from the transaction details. The transaction details can be analyzed by the ML model and/or the rules engine to determine output data for inclusion in an output payload. Associated transaction data may include whether the transaction is a one-time transaction or a recurring transaction, shipment intents, and other types of intents that are embedded into the transaction.

Other details of a submitted transaction that can be analyzed by a payload engine include: the payment instrument (e.g., credit card or debit card); the payment method (e.g., card present or card absent transaction); the transaction region/jurisdiction; the client and the issuer (e.g., when the transaction service provider act as a merchant acquirer, who the merchant is and who is the issuing institution); a client configuration; any entitlements of the client; the transaction data received from the payment network; any validations; whether there is missing data; a retry strategy preference; time criticality of the transaction; any client overrides or bypasses; etc.

Additionally, prior processing results and historical data may be used to formulate an output payload that will optimize transaction processing at a transaction processing engine. Historical data, including historical transactions, may be used to train the relevant ML model so that accurate predictions can be made with respect to payload data optimization of submitted transactions. Analysis of historical transactions may be in the context of a platform's knowledge (i.e., amassed historical data) of a payment product's card/account number and information about the issuer and/or cardholder associated with the number. Historical transaction data may be analyzed to understand issuer behaviors (e.g., authorizations vs. declines), the impact of various transaction data elements, the impact of value-added services on authorizations, etc.

In accordance with aspects, a transaction preparation platform may automate consumption of input rules via AI and ML models, such as natural language processing (NLP) models that can read textual versions of various published rules from government, payment networks, etc., and build the rules as available parameters to a transaction payload formula based on other input.

In accordance with aspects, a ML model of a payload engine may be trained with a training data set of historical data that reflects optimized output in various situations. Historical data may include seasoned data that can be validated and verified so that a high level of trust may be maintained that the data reflects the desired training objectives. Exemplary historical data may include data (e.g., merchant data recorded at a transaction preparation platform) used in payment authorizations conducted between the current time and up to multiple months before the current time. The training data may be exposed to the ML model to train the model. The training may be supervised and may be monitored by human actors to ensure the model does not provide output that conflicts with any of the input rules (e.g., client rules, regional rules, etc., as discussed herein). Recurring training may be employed based on updated data sets as they are produced, so that the model's predictions do not become stale or inaccurate.

Additionally, a rules engine may be used in a payload engine for relatively simple decisions, such as Boolean decisions, that the system is required to make. The rules engine may be based on logical decision paths and may be used to process transaction decisions that fit the logical paths of the rules engine. The rules engine and its logical paths may also be used as a training data set for the ML model, in order to update the model's decisioning paths with those of the rules engine.

In accordance with aspects, each transaction received at a transaction preparation platform from a client may be processed by a payload engine prior to being submitted to a transaction processing engine. The payload engine may take the received transaction (and any data submitted therewith), along with the various other forms of input discussed herein and may process the input with one or more ML models and/or a rules engine. The output of the payload engine may include a set of parameters that, when received by a transaction processing engine, instruct the transaction processing engine with respect to transaction processing steps that are to be performed in the processing of the received transaction. Each transaction may receive a customized set of parameters based on the totality of the input received by the payload engine. The customized set of parameters produced by a payload engine for a given transaction is referred to herein as a "transaction payload formula," a "payload formula," or simply a "formula."

A payload engine's output may be a combination of output from a rules engine and from a ML model. Output consists of a transaction payload formula to send to a transaction processing engine that is configured to process transactions according to received data and parameters associated with a given transaction. Output may include more than one transaction payload formula for a given transaction. For instance, output may include a primary transaction payload formula and a secondary transaction payload formula. The primary transaction payload formula may be the preferred, or most optimized, formula for obtaining an authorization. The secondary transaction payload formula may be used as a backup formula to the primary formula.

A transaction preparation platform and payload engine may be configured to use the secondary transaction payload formula in the event that the primary transaction formula results in a declined transaction. The system may be configured to produce additional transaction formulas as backup formulas as well. For example, third, fourth, fifth, etc., formulas may be produced and may be applied by the transaction engine in their numbered order as backups to higher-numbered formulas.

Backup transaction payload formulas may invoke less or different rules than a primary or higher-ordered formula. A transaction processing engine may apply the rules/data received in a backup formula in order to increase the chance that a transaction will be authorized. Backup formulas may be less optimized than a primary formula but may achieve authorization for the transaction in lieu of processing the transaction with the most optimized rules.

In accordance with aspects, a transaction payload formula may include parameters and data that are used by a transaction processing engine, a payment network, an authorization service (e.g., provided by an issuer), and/or other downstream processing components to process a transaction. The format of a transaction payload formula may be according to the format expected by a transaction processing engine. Exemplary formats include templated application programming interface (API) method calls and ISO formatted messages from, e.g., a messaging queue. For instance, a transaction processing engine may be configured to expose one or more API methods whose parameters instruct the transaction processing engine with respect to a customized transaction processing route for a given transaction. A payload engine, upon producing a transaction processing payload may be configured to call an API method exposed by a transaction processing engine and parameterize the method with the payload elements determined for a received transaction.

In other aspects, a transaction processing engine may be configured to receive messages from a transaction messaging queue (e.g., the transaction engine may "subscribe" to the transaction messaging queue). The messages from the transaction messaging queue may include parameters that instruct the transaction processing engine with respect to a customized transaction processing route for a given transaction. A payload engine, upon producing a transaction processing payload may be configured to generate a message that is appropriately formatted with necessary and optional data parameters for processing the transaction and send the message to the transaction messaging queue, where it may be consumed by the transaction processing engine. The message may be, e.g., formatted according to transaction processing requirements and may be standardized according to a standards body such as, e.g., the International Organization for Standardization (ISO).

In accordance with aspects, other exemplary interface formats/protocols that may be used include GraphQL APIs, gRPC, and QUIC.

FIG. 1A is a block diagram of a system for providing transaction payload formulas, in accordance with aspects. System 100 includes transaction preparation platform 110. Transaction preparation platform 110 includes payload engine 120, which includes machine learning (ML) engine 124 and rules engine 122. Transaction preparation platform 110 also includes client preferences database 130, input database 132, historical database 134, and training database 136. System 100 further includes transaction processing engine 150, which publishes transaction processing API 152. System 100 includes payment network 160 and authorization service 170. Additionally, system 100 includes client 140, input source 142, and input source 144.

Client preferences database 130, input database 132, historical database 134, and training database 136 each may be any suitable data store, such as a relational database, an OLTP database, an OLAP database, a data lake, a data warehouse, a NoSQL database, etc. Although depicted as separate databases, these databases may be combined into one, or any necessary or desirable number of databases. Client preferences database 130 stores client instructions received from client 140. A client instruction includes a directive or preference from a client that indicates a desired result with respect to a given transaction. A client instruction may also be a high-level preference with respect to all, or a defined set, of a client's transactions. Client instructions are discussed in more detail herein.

Input database 132 stores input data used by ML engine 124 and/or rules engine 122. Input data may be received from various sources, such as input source 142 and input source 144. Input source 142 may represent, e.g., a regional or governmental authority, and may provide input such as regulatory processing rules, processing best practice rules, etc. Input source 144 may represent, e.g., a payment network provider and may provide input such as payment network requirements or optional input with respect to necessary data/parameters used by a corresponding payment network in routing/processing transactions. Although only two input sources are depicted in FIG. 1A, it is contemplated that any necessary or desirable number of input providers may provide input to the transaction preparation platform. Various exemplary forms of input that may be stored in input database 132 are discussed in more detail herein.

Historical database 134 stores historical records of transactions, associated payloads, associated authorization outcomes, records received from payment networks, and other historical data captured, or received by, an acquirer or other provider of transaction preparation platform 110. Historical database 134 may be accessible by ML engine 124 for training purposes. Training database 136 may store other training data, such as manually supplied and supervised training data and may be accessible to ML engine 124 for training purposes.

Machine learning engine 124 may provide a machine learning (ML) model that may process received transactions from client 140 in view of client preferences database 130 and input database 132. ML engine 124 may utilize any acceptable ML model type. For instance, ML engine 124 may utilize one or more neural network models, decision tree models, Bayesian models, Gaussian models, regression models, etc.

Rules engine 122 may provide Boolean logic that may be structured as a logic tree. The provided logic tree may provide payload parameters where input lends itself to relatively simple decisions. Exemplary decisions that may be processed with rules engine 122 include scenarios where a merchant or other client has directly indicated a desired result. For instance, a client may indicate that 3-D Secure processing is needed when an authorization amount is above a certain threshold. Rules engine 122 can also be used to direct cost-based routing decisions, e.g., in regions such as the United States where pin-less debit card transactions have market share. Additionally, a rules engine may be used where decisions can be made static or configuration driven. For instance, in cost routing decisions, a client may provide a cost processing configuration as a client preference, which may be implemented via rules engine 122. Rules engine 122 may be used when the cost of using ML engine 124 for decisioning would outweigh the benefit. Rules engine 122 may provide faster processing and resource optimization.

Additionally, when rules engine 122 is used in a transaction decisioning process, a feedback loop of the processed transactions may be provided to ML engine 124 for training of ML engine 124. For instance, a neural optimizer of a ML model provided by ML engine 124 may be trained on all transactions processed by rules engine 122.

In accordance with aspects, client preferences may be received at client preferences database 130. Other input data may be received at input database 132. Additionally, a transaction may be received from client 140 at payload engine 120. Payload engine 120 may process the received transaction and associated transaction details with ML engine 124 and rules engine 122. Based on the processing, payload engine 120 may generate a transaction payload formula including parameters based on predictions made by ML engine 124 based on client preferences and other input data, and on output from rules engine 122. Payload engine 120 may be configured to call an API method published by transaction processing API 152 of transaction processing engine 150. The API method may take arguments in the form of data parameters that are included in the transaction payload formula. Payload engine 120 may parameterize the API method with the parameters of the transaction payload formula and may send the parameters via the API method call to transaction processing engine 150.

Transaction processing engine 150 may begin routing/processing of the transaction according to the parameters included in the API method via payment network 160, which may, in turn, route the transaction to authorization service 170. Authorization service 170 may authorize (or decline) the transaction and send a response to transaction processing engine 150 via payment network 160 (or, in other aspects, directly to transaction processing engine 150). Transaction processing engine 150 may communicate the response back to transaction preparation platform 110/payload engine 120, which may persist the response details to historical database 134.

In accordance with aspects, systems described herein may provide one or more application programming interfaces (APIs) in order to facilitate communication with related/provided applications and/or among various public or partner technology backends, data centers, or the like. APIs may publish various methods and expose the methods via API gateways. A published API method may be called by an application that is authorized to access the published API methods. API methods may take data as one or more parameters of the called method. API access may be governed by an API gateway associated with a corresponding API. Incoming API method calls may be routed to an API gateway and the API gateway may forward the method calls to internal API servers that may execute the called method, perform processing on any data received as parameters of the called method, and send a return communication to the method caller via the API gateway. A return communication may also include data based on the called method and its data parameters. API gateways may be public or private gateways. A public API gateway may accept method calls from any source without first authenticating or validating the calling source. A private API gateway may require a source to authenticate or validate itself via an authentication or validation service before access to published API methods is granted. APIs may be exposed via dedicated and private communication channels such as private computer networks or may be exposed via public communication channels such as a public computer network (e.g., the internet). APIs, as discussed herein, may be based on any suitable API architecture. Exemplary API architectures and/or protocols include SOAP (Simple Object Access Protocol), XML-RPC, REST (Representational State Transfer), or the like.

Figure 1B:
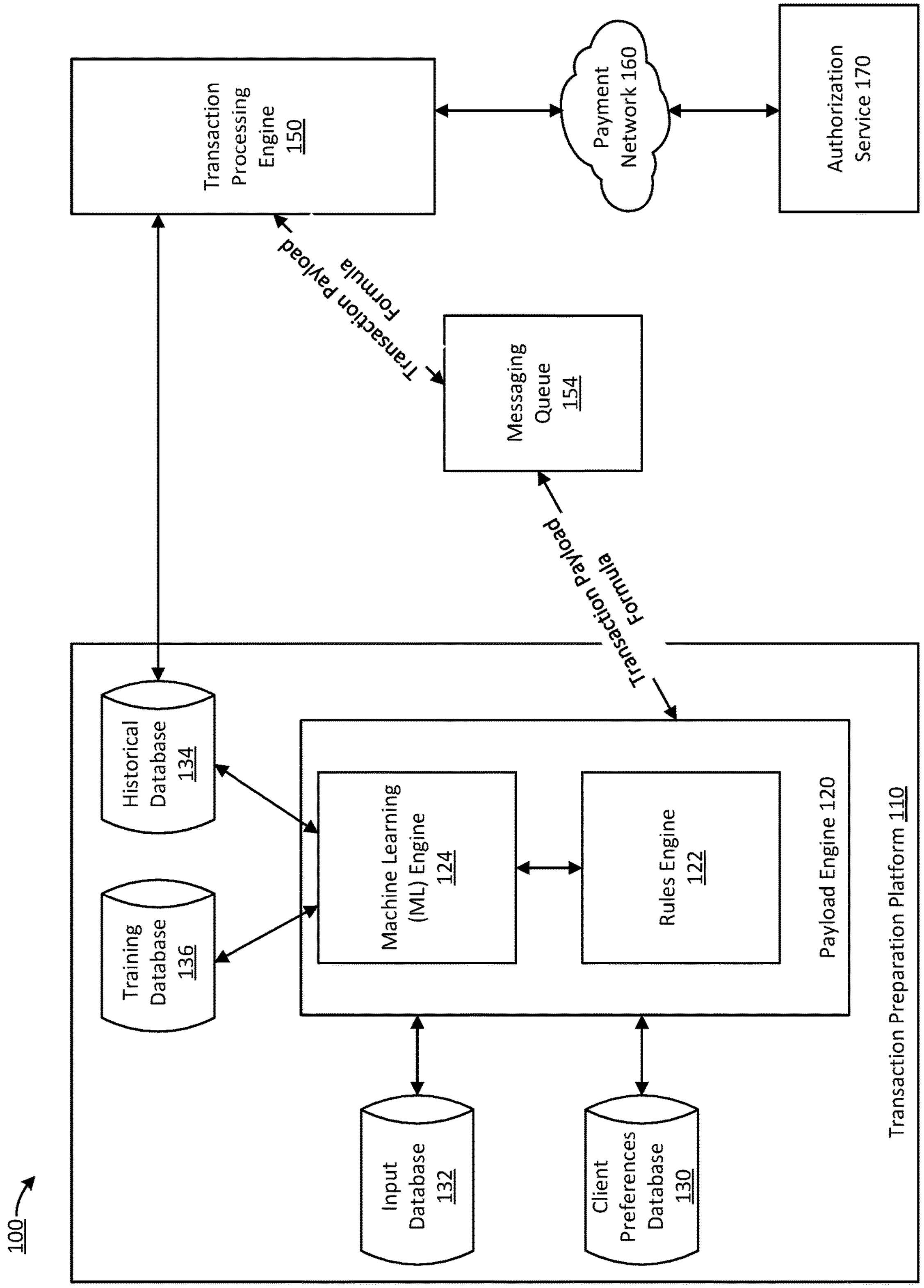
FIG. 1B is a block diagram of a system for providing transaction payload formulas, in accordance with aspects.

FIG. 1B is a block diagram of a system for providing transaction payload formulas, in accordance with aspects. FIG. 1B depicts payload engine 120 communicating transaction payload formulas to messaging queue 154. Message queue 154 may be configured as a queue data structure and may facilitate communication between disparate systems or services. Payload engine 120 may place transaction payload formulas as messages on the queue and transaction processing engine 150 may subscribe to and consume transaction payload formula messages from the queue. A service or application that submits messages to a messaging queue is referred to as a producer, and a service or application that consumes messages from a messaging queue is referred to as a consumer. The communication may be asynchronous. That is, the messages may be placed on the queue by one service at one time and may be consumed from the queue by another service at another time, and a producer need not wait for a response from a consumer before continuing with other processing tasks. The messaging queue stores the message until the consumer consumes it. The messaging queue may include a message broker. A message broker can translate a message from a protocol or format that it is received in from the producer to a protocol or format that it is consumed in by the consumer.

In accordance with aspects, a client may submit client instructions via a client facing management portal provided by a transaction preparation platform. A management portal may provide an interface (e.g., a graphical user interface (GUI)) via which a client of the platform can submit client instructions. For instance, a client may be able to specify, through the interface, a number of value-added services that the client would like applied to transactions submitted to the platform. In some aspects, a client may specify different processing profiles for different transaction types. A processing profile may be a logical grouping of client instructions that are applied based on an identified transaction type. For example, a client may specify a particular profile for a card-present transaction, and a different profile for a card-not-present transaction. Likewise, a client may specify a particular profile for debit card transactions versus credit card transactions.

All transactions from a client may be received at a single endpoint (e.g., via a single API gateway provided by the platform). In accordance with aspects, the transaction may be processed by an ML engine, which may assign the various client instructions in view of the identified transaction type. For instance, based on the transaction type, the ML engine may assign various value-added services to be performed and may collect various payload parameters from the assigned services for inclusion in a corresponding transaction payload formula. The ML engine may further assign parameters to a corresponding transaction payload formula based on other input rules derived from various other inputs. A rules engine may also be used to provide still other parameters to the formula where provision of such parameters is deemed more efficient when provided by the rules engine.

Figure 2:
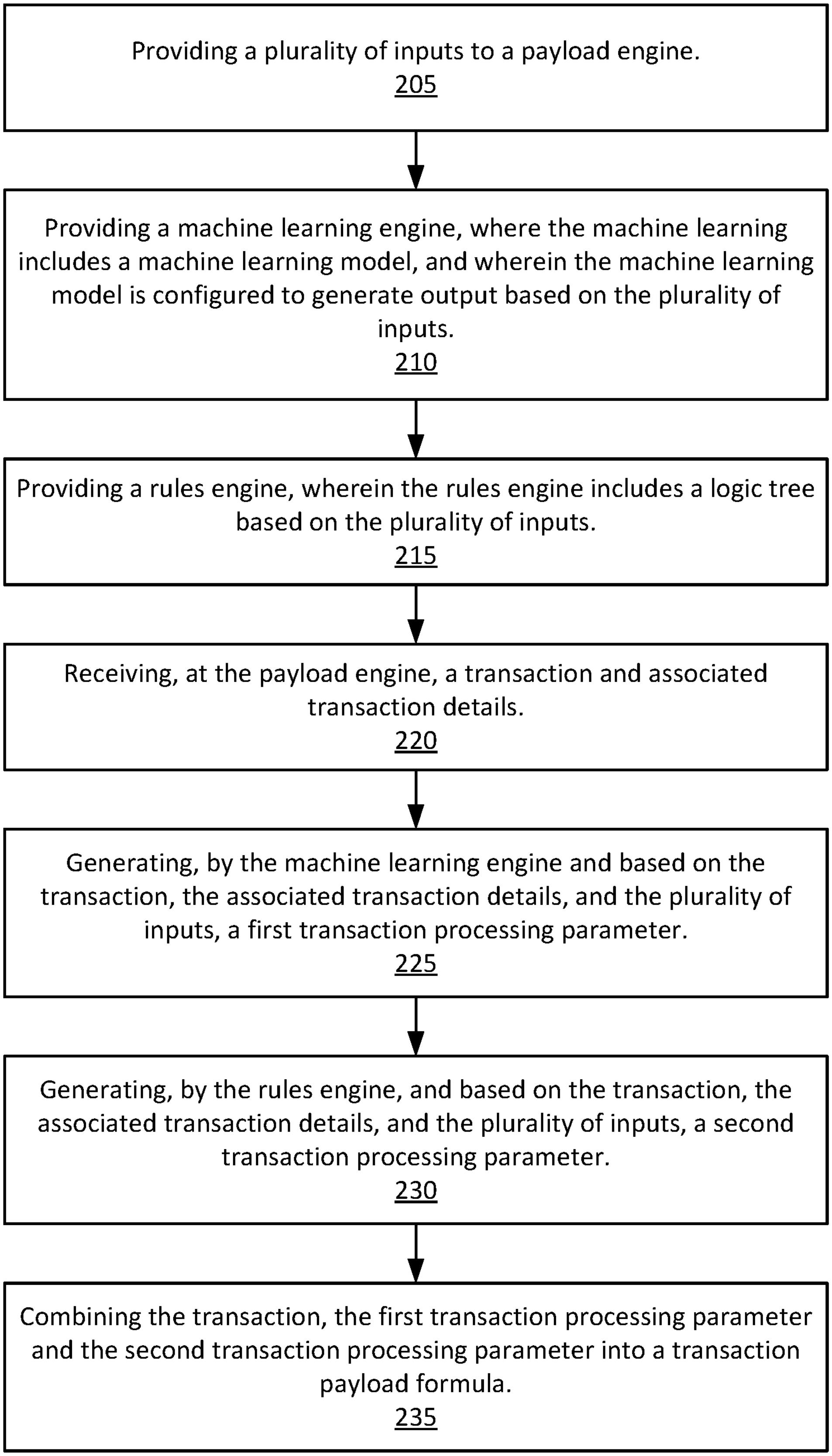
FIG. 2 is a logical flow for providing a transaction payload formula, in accordance with aspects.

FIG. 2 is a logical flow for providing a transaction payload formula, in accordance with aspects.

Step 205 includes providing a plurality of inputs to a payload engine.

Step 210 includes providing a machine learning engine, where the machine learning includes a machine learning model, and wherein the machine learning model is configured to generate output based on the plurality of inputs.

Step 215 includes providing a rules engine, wherein the rules engine includes a logic tree based on the plurality of inputs.

Step 220 includes receiving, at the payload engine, a transaction and associated transaction details.

Step 225 includes generating, by the machine learning engine and based on the transaction, the associated transaction details, and the plurality of inputs, a first transaction processing parameter.

Step 230 includes generating, by the rules engine, and based on the transaction, the associated transaction details, and the plurality of inputs, a second transaction processing parameter.

Step 235 includes combining the transaction, the first transaction processing parameter and the second transaction processing parameter into a transaction payload formula.

Figure 3:
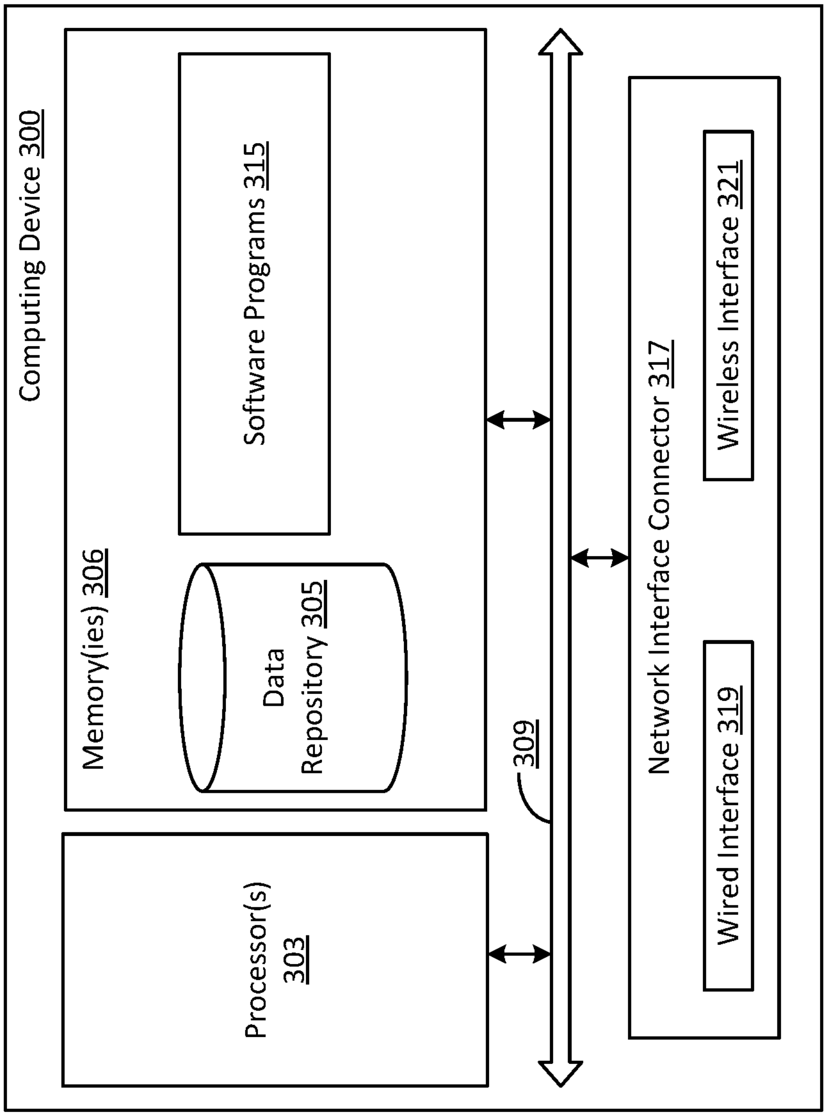
FIG. 3 is a block diagram of a computing device for implementing certain aspects of the present disclosure.

FIG. 3 is a block diagram of a computing device for implementing certain aspects of the present disclosure. FIG. 3 depicts exemplary computing device 300. Computing device 300 may represent hardware that executes the logic that drives the various system components described herein. For example, system components such as a payload engine, a machine learning engine, a rules engine, a messaging queue, a transaction processing engine, various database engines and database servers, and other computer applications and logic may include, and/or execute on, components and configurations like, or similar to, computing device 300.

Computing device 300 includes a processor 303 coupled to a memory 306. Memory 306 may include volatile memory and/or persistent memory. The processor 303 executes computer-executable program code stored in memory 306, such as software programs 315. Software programs 315 may include one or more of the logical steps disclosed herein as a programmatic instruction, which can be executed by processor 303. Memory 306 may also include data repository 305, which may be nonvolatile memory for data persistence. The processor 303 and the memory 306 may be coupled by a bus 309. In some examples, the bus 309 may also be coupled to one or more network interface connectors 317, such as wired network interface 319, and/or wireless network interface 321. Computing device 300 may also have user interface components, such as a screen for displaying graphical user interfaces and receiving input from the user, a mouse, a keyboard and/or other input/output components (not shown).

The various processing steps, logical steps, and/or data flows depicted in the figures and described in greater detail herein may be accomplished using some or all of the system components also described herein. In some implementations, the described logical steps may be performed in different sequences and various steps may be omitted. Additional steps may be performed along with some, or all of the steps shown in the depicted logical flow diagrams. Some steps may be performed simultaneously. Accordingly, the logical flows illustrated in the figures and described in greater detail herein are meant to be exemplary and, as such, should not be viewed as limiting. These logical flows may be implemented in the form of executable instructions stored on a machine-readable storage medium and executed by a micro-processor and/or in the form of statically or dynamically programmed electronic circuitry.

The system of the invention or portions of the system of the invention may be in the form of a "processing machine" a "computing device," or an "electronic device" etc. These may be a general-purpose computer, a computer server, a host machine, etc. As used herein, the term "processing machine," "computing device, "electronic device," or the like is to be understood to include at least one processor that uses at least one memory. The at least one memory stores a set of instructions. The instructions may be either permanently or temporarily stored in the memory or memories of the processing machine. The processor executes the instructions that are stored in the memory or memories in order to process data. The set of instructions may include various instructions that perform a particular task or tasks, such as those tasks described above. Such a set of instructions for performing a particular task may be characterized as a program, software program, or simply software. In one aspect, the processing machine may be a specialized processor.

As noted above, the processing machine executes the instructions that are stored in the memory or memories to process data. This processing of data may be in response to commands by a user or users of the processing machine, in response to previous processing, in response to a request by another processing machine and/or any other input, for example. The processing machine used to implement the invention may utilize a suitable operating system, and instructions may come directly or indirectly from the operating system.

As noted above, the processing machine used to implement the invention may be a general-purpose computer. However, the processing machine described above may also utilize any of a wide variety of other technologies including a special purpose computer, a computer system including, for example, a microcomputer, mini-computer or mainframe, a programmed microprocessor, a micro-controller, a peripheral integrated circuit element, a CSIC (Customer Specific Integrated Circuit) or ASIC (Application Specific Integrated Circuit) or other integrated circuit, a logic circuit, a digital signal processor, a programmable logic device such as a FPGA, PLD, PLA or PAL, or any other device or arrangement of devices that is capable of implementing the steps of the processes of the invention.

It is appreciated that in order to practice the method of the invention as described above, it is not necessary that the processors and/or the memories of the processing machine be physically located in the same geographical place. That is, each of the processors and the memories used by the processing machine may be located in geographically distinct locations and connected so as to communicate in any suitable manner. Additionally, it is appreciated that each of the processor and/or the memory may be composed of different physical pieces of equipment. Accordingly, it is not necessary that the processor be one single piece of equipment in one location and that the memory be another single piece of equipment in another location. That is, it is contemplated that the processor may be two pieces of equipment in two different physical locations. The two distinct pieces of equipment may be connected in any suitable manner. Additionally, the memory may include two or more portions of memory in two or more physical locations.

To explain further, processing, as described above, is performed by various components and various memories. However, it is appreciated that the processing performed by two distinct components as described above may, in accordance with a further aspect of the invention, be performed by a single component. Further, the processing performed by one distinct component as described above may be performed by two distinct components. In a similar manner, the memory storage performed by two distinct memory portions as described above may, in accordance with a further aspect of the invention, be performed by a single memory portion. Further, the memory storage performed by one distinct memory portion as described above may be performed by two memory portions.

Further, various technologies may be used to provide communication between the various processors and/or memories, as well as to allow the processors and/or the memories of the invention to communicate with any other entity, i.e., so as to obtain further instructions or to access and use remote memory stores, for example. Such technologies used to provide such communication might include a network, the Internet, Intranet, Extranet, LAN, an Ethernet, wireless communication via cell tower or satellite, or any client server system that provides communication, for example. Such communications technologies may use any suitable protocol such as TCP/IP, UDP, or OSI, for example.

As described above, a set of instructions may be used in the processing of the invention. The set of instructions may be in the form of a program or software. The software may be in the form of system software or application software, for example. The software might also be in the form of a collection of separate programs, a program module within a larger program, or a portion of a program module, for example. The software used might also include modular programming in the form of object-oriented programming. The software tells the processing machine what to do with the data being processed.

Further, it is appreciated that the instructions or set of instructions used in the implementation and operation of the invention may be in a suitable form such that the processing machine may read the instructions. For example, the instructions that form a program may be in the form of a suitable programming language, which is converted to machine language or object code to allow the processor or processors to read the instructions. That is, written lines of programming code or source code, in a particular programming language, are converted to machine language using a compiler, assembler or interpreter. The machine language is binary coded machine instructions that are specific to a particular type of processing machine, i.e., to a particular type of computer, for example. The computer understands the machine language.

Any suitable programming language may be used in accordance with the various aspects of the invention. Illustratively, the programming language used may include assembly language, Ada, APL, Basic, C, C++, COBOL, dBase, Forth, Fortran, Java, Modula-2, Pascal, Prolog, REXX, Visual Basic, JavaScript, python, R, Go Lang, PHP, Swift, and/or React, for example. Further, it is not necessary that a single type of instruction or single programming language be utilized in conjunction with the operation of the system and method of the invention. Rather, any number of different programming languages may be utilized as is necessary and/or desirable.

Also, the instructions and/or data used in the practice of the invention may utilize any compression or encryption technique or algorithm, as may be desired. An encryption module might be used to encrypt data. Further, files or other data may be decrypted using a suitable decryption module, for example.

As described above, the invention may illustratively be embodied in the form of a processing machine, including a computer or computer system, for example, that includes at least one memory. It is to be appreciated that the set of instructions, i.e., the software for example, that enables the computer operating system to perform the operations described above may be contained on any of a wide variety of media or medium, as desired. Further, the data that is processed by the set of instructions might also be contained on any of a wide variety of media or medium. That is, the particular medium, i.e., the memory in the processing machine, utilized to hold the set of instructions and/or the data used in the invention may take on any of a variety of physical forms or transmissions, for example. Illustratively, the medium may be in the form of a compact disk, a DVD, an integrated circuit, a hard disk, a floppy disk, an optical disk, a magnetic tape, a RAM, a ROM, a PROM, an EPROM, a wire, a cable, a fiber, a communications channel, a satellite transmission, a memory card, a SIM card, or other remote transmission, as well as any other medium or source of data that may be read by the processors of the invention.

Further, the memory or memories used in the processing machine that implements the invention may be in any of a wide variety of forms to allow the memory to hold instructions, data, or other information, as is desired. Thus, the memory might be in the form of a database to hold data. The database might use any desired arrangement of files such as a flat file arrangement or a relational database arrangement, for example.

In the system and method of the invention, a variety of "user interfaces" may be utilized to allow a user to interface with the processing machine or machines that are used to implement the invention. As used herein, a user interface includes any hardware, software, or combination of hardware and software used by the processing machine that allows a user to interact with the processing machine. A user interface may be in the form of a dialogue screen for example. A user interface may also include any of a mouse, touch screen, keyboard, keypad, voice reader, voice recognizer, dialogue screen, menu box, list, checkbox, toggle switch, a pushbutton or any other device that allows a user to receive information regarding the operation of the processing machine as it processes a set of instructions and/or provides the processing machine with information. Accordingly, the user interface is any device that provides communication between a user and a processing machine. The information provided by the user to the processing machine through the user interface may be in the form of a command, a selection of data, or some other input, for example.

As discussed above, a user interface is utilized by the processing machine that performs a set of instructions such that the processing machine processes data for a user. The user interface is typically used by the processing machine for interacting with a user either to convey information or receive information from the user. However, it should be appreciated that in accordance with some aspects of the system and method of the invention, it is not necessary that a human user actually interact with a user interface used by the processing machine of the invention. Rather, it is also contemplated that the user interface of the invention might interact, i.e., convey and receive information, with another processing machine, rather than a human user. Accordingly, the other processing machine might be characterized as a user. Further, it is contemplated that a user interface utilized in the system and method of the invention may interact partially with another processing machine or processing machines, while also interacting partially with a human user.

It will be readily understood by those persons skilled in the art that the present invention is susceptible to broad utility and application. Many aspects and adaptations of the present invention other than those herein described, as well as many variations, modifications, and equivalent arrangements, will be apparent from or reasonably suggested by the present invention and foregoing description thereof, without departing from the substance or scope of the invention.

Accordingly, while the present invention has been described here in detail in relation to its exemplary aspects, it is to be understood that this disclosure is only illustrative and exemplary of the present invention and is made to provide an enabling disclosure of the invention. Accordingly, the foregoing disclosure is not intended to be construed or to limit the present invention or otherwise to exclude any other such aspects, adaptations, variations, modifications, or equivalent arrangements.

The invention claimed is:

1. A method comprising:

providing a plurality of inputs to a payload engine;

providing a machine learning engine, wherein the machine learning includes a machine learning model, and wherein the machine learning model is configured to generate output based on the plurality of inputs;

providing a rules engine, wherein the rules engine includes a logic tree based on the plurality of inputs;

receiving, at the payload engine, a transaction and associated transaction details;

generating, by the machine learning engine and based on the transaction, the associated transaction details, and the plurality of inputs, a first transaction processing parameter;

generating, by the rules engine, and based on the transaction, the associated transaction details, and the plurality of inputs, a second transaction processing parameter;

adhering the first transaction processing parameter and the second transaction processing parameter to one or more input rules to form a transaction payload;

parameterizing the transaction payload to an API method exposed by the transaction processing engine and called by the payload engine; and executing, by the transaction processing engine, a customized transaction processing route specific to the transaction according to the transaction payload of the API method.

2. The method of claim 1, wherein the plurality of inputs includes client instructions.

3. The method of claim 1, wherein the plurality of inputs includes regional rules.

4. The method of claim 1, wherein the plurality of inputs includes network rules.

5. A system comprising at least one computer including a processor, wherein the at least one computer is configured to:

receive a plurality of inputs at a payload engine;

execute a machine learning engine, wherein the machine learning includes a machine learning model, and wherein the machine learning model is configured to generate output based on the plurality of inputs;

execute a rules engine, wherein the rules engine includes a logic tree based on the plurality of inputs;

receive, at the payload engine, a transaction and associated transaction details;

generate, by the machine learning engine and based on the transaction, the associated transaction details, and the plurality of inputs, a first transaction processing parameter;

generate, by the rules engine, and based on the transaction, the associated transaction details, and the plurality of inputs, a second transaction processing parameter;

adhere the first transaction processing parameter and the second transaction processing parameter to one or more input rules to form a transaction payload;

parameterize the transaction payload to an API method exposed by the transaction processing engine and called by the payload engine; and execute, by the transaction processing engine, a customized transaction processing route specific to the transaction according to the transaction payload of the API method.

6. The system of claim 5, wherein the plurality of inputs includes client instructions.

7. The system of claim 5, wherein the plurality of inputs includes regional rules.

8. The system of claim 5, wherein the plurality of inputs includes network rules.

9. A non-transitory computer readable storage medium, including instructions stored thereon, which instructions, when read and executed by one or more computer processors, cause the one or more computer processors to perform steps comprising:

providing a plurality of inputs to a payload engine;

providing a machine learning engine, wherein the machine learning includes a machine learning model, and wherein the machine learning model is configured to generate output based on the plurality of inputs;

providing a rules engine, wherein the rules engine includes a logic tree based on the plurality of inputs;

receiving, at the payload engine, a transaction and associated transaction details;

generating, by the machine learning engine and based on the transaction, the associated transaction details, and the plurality of inputs, a first transaction processing parameter;

generating, by the rules engine, and based on the transaction, the associated transaction details, and the plurality of inputs, a second transaction processing parameter;

adhering the first transaction processing parameter and the second transaction processing parameter to one or more input rules to form a transaction payload;

parameterizing the transaction payload to an API method exposed by the transaction processing engine and called by the payload engine; and executing, by the transaction processing engine, a customized transaction processing route specific to the transaction according to the transaction payload of the API method.

10. The non-transitory computer readable storage medium of claim 9, wherein the plurality of inputs includes client instructions.

11. The non-transitory computer readable storage medium of claim 9, wherein the plurality of inputs includes regional rules and network rules.

* * * * *